May 5, 1931.   W. J. AITKEN   1,803,583
AUTOMOBILE HANDLING AND STORING APPARATUS
Filed July 19, 1929   12 Sheets-Sheet 1
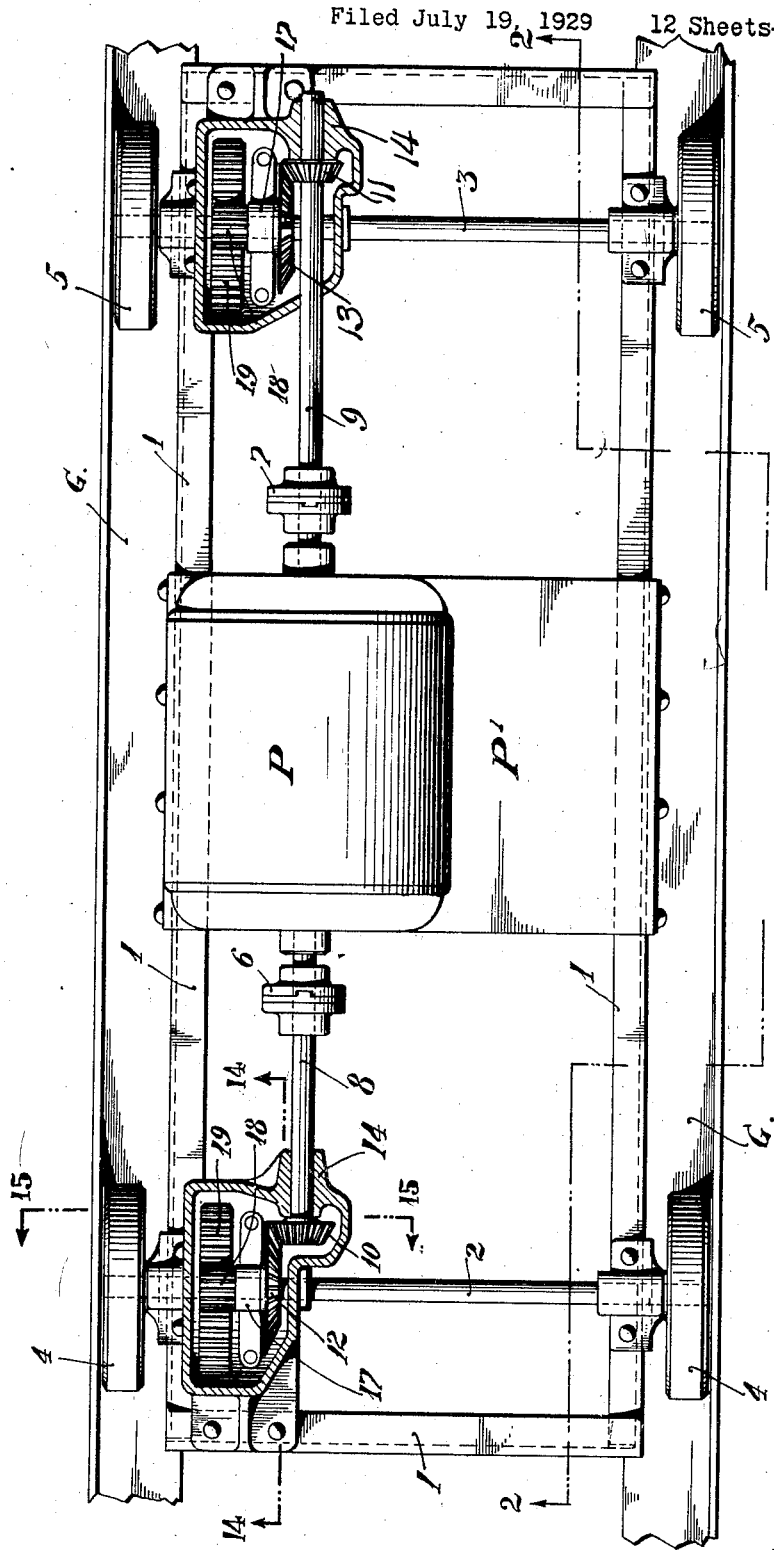
INVENTOR
BY William J. Aitken
ATTORNEY

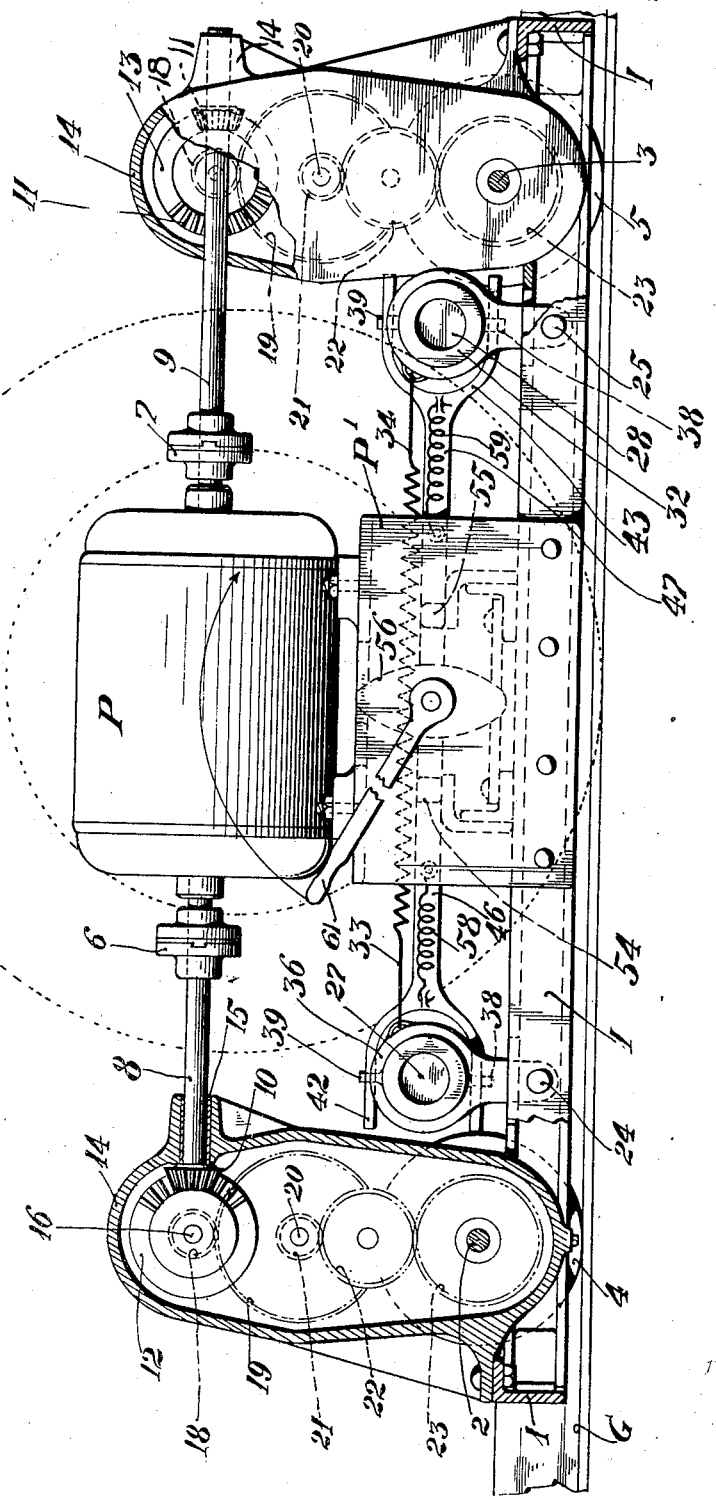

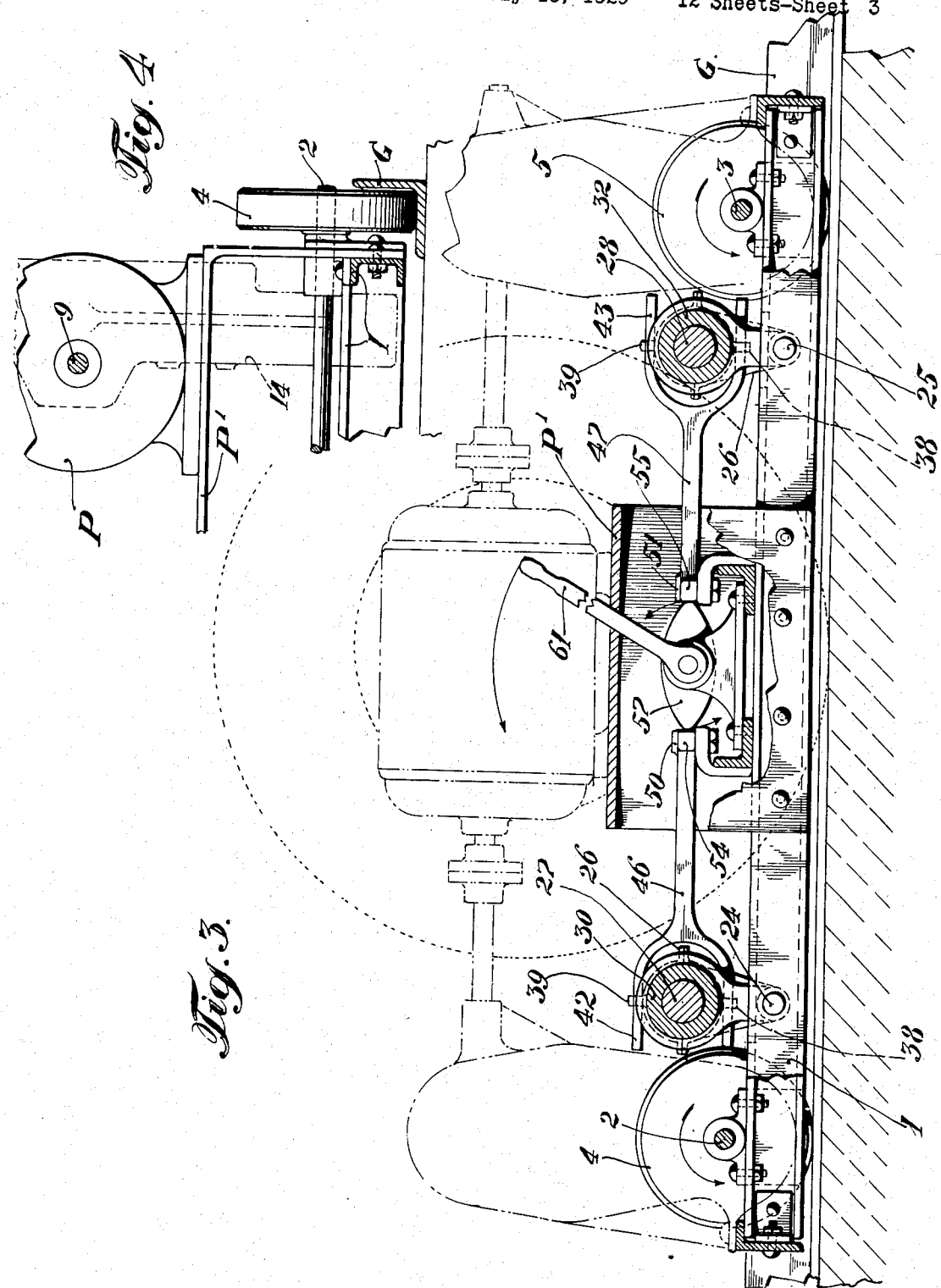

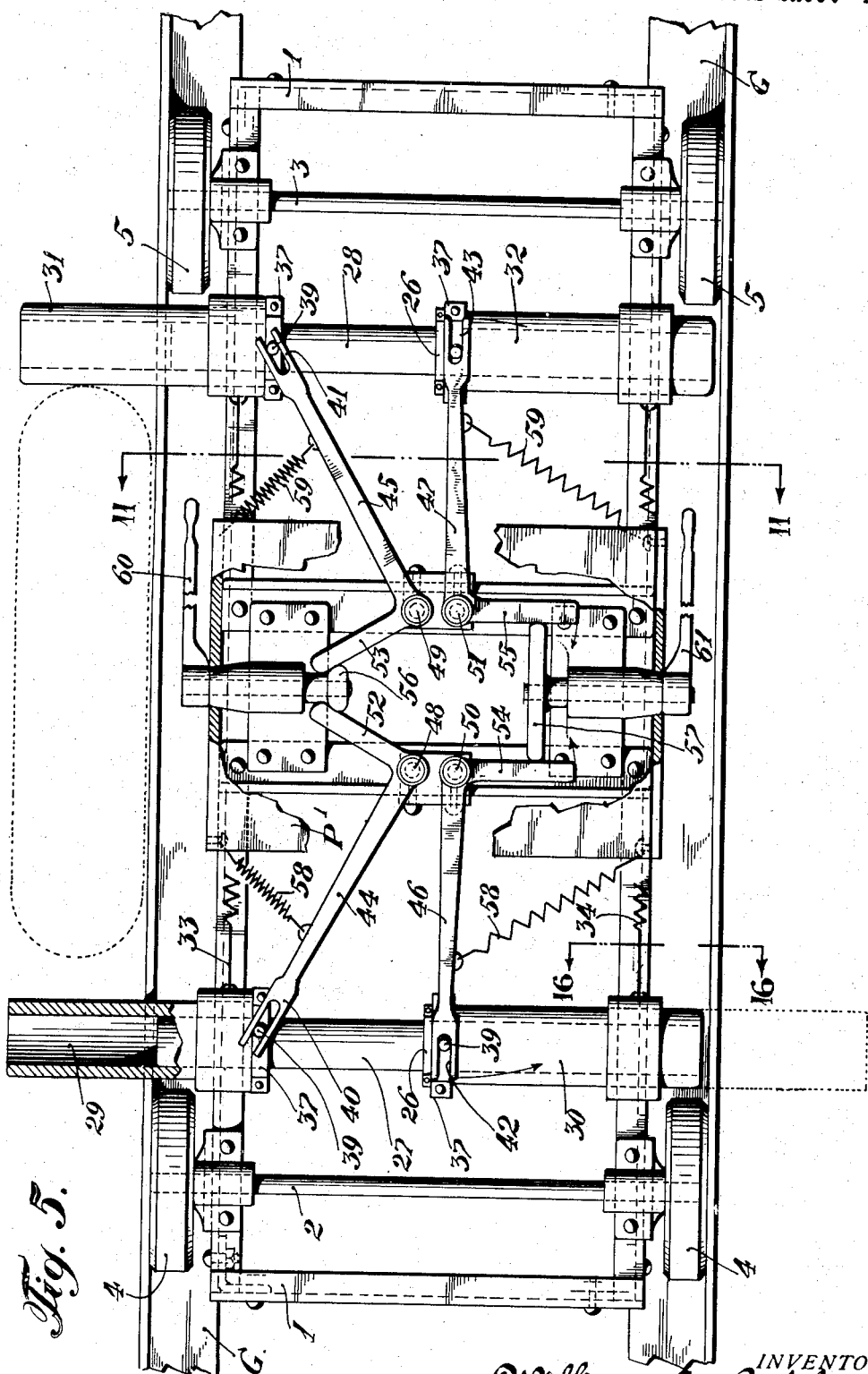

May 5, 1931.  W. J. AITKEN  1,803,583
AUTOMOBILE HANDLING AND STORING APPARATUS
Filed July 19, 1929   12 Sheets-Sheet 5
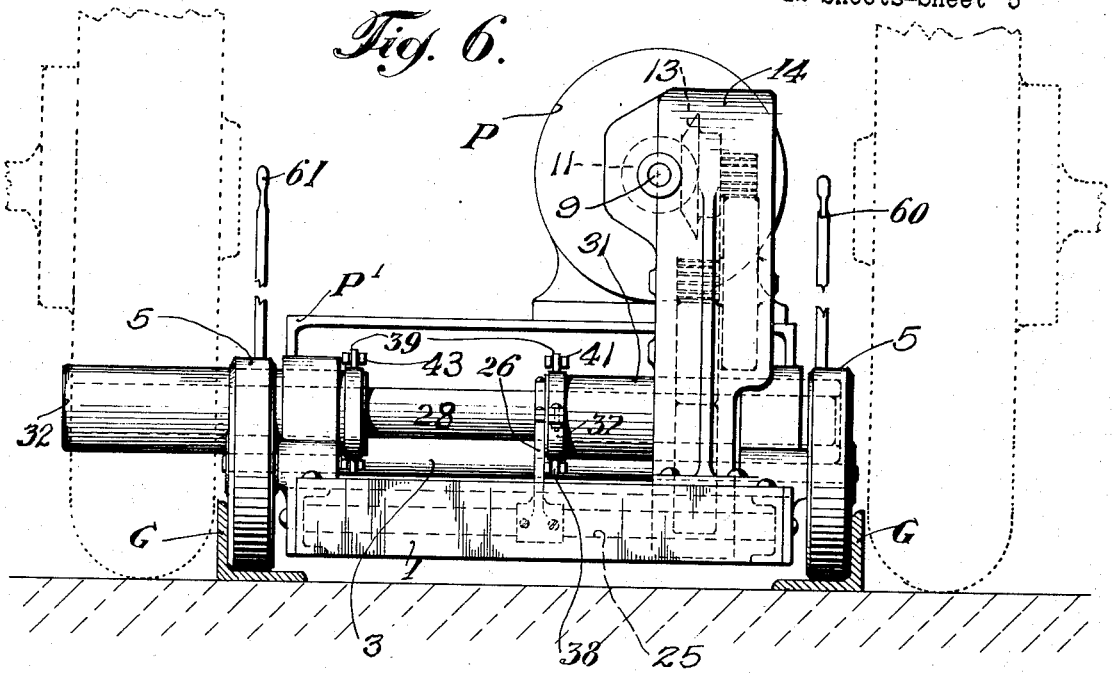
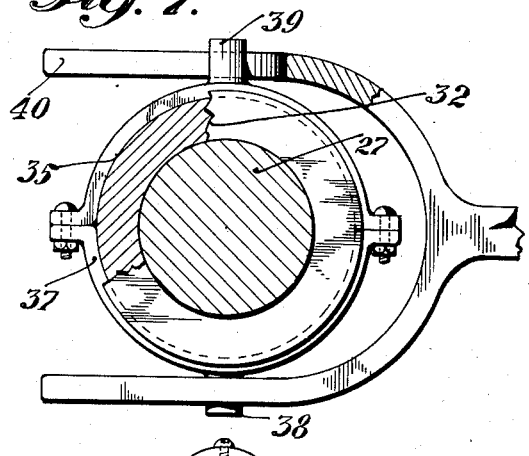
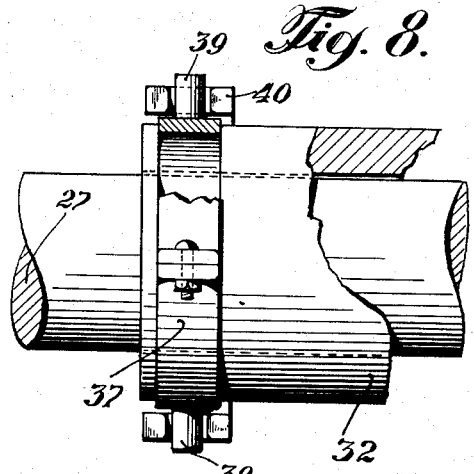
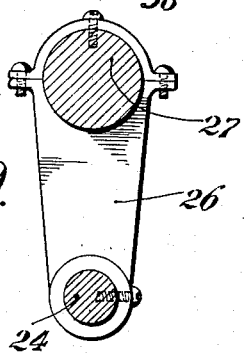
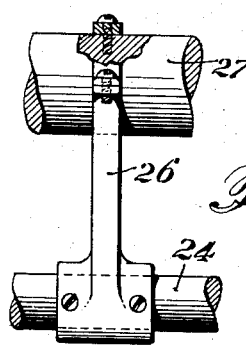
INVENTOR
William J. Aitken
BY
ATTORNEY

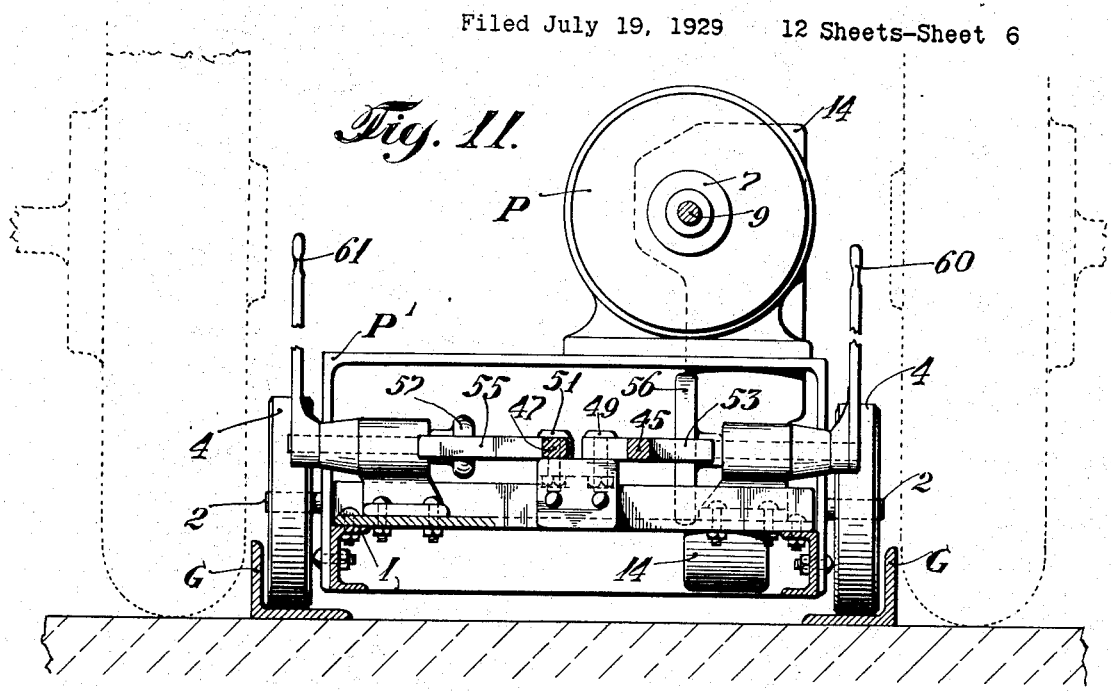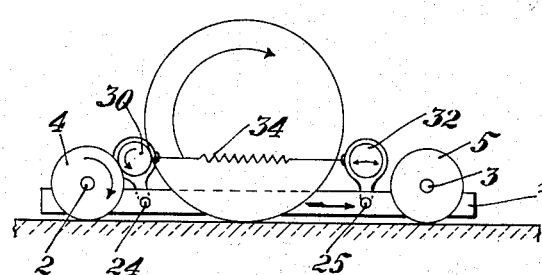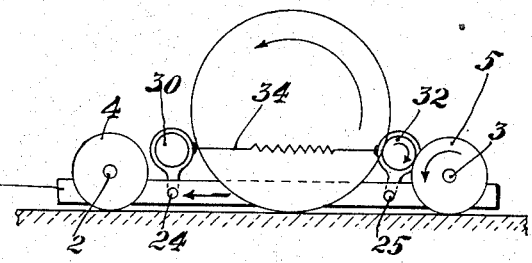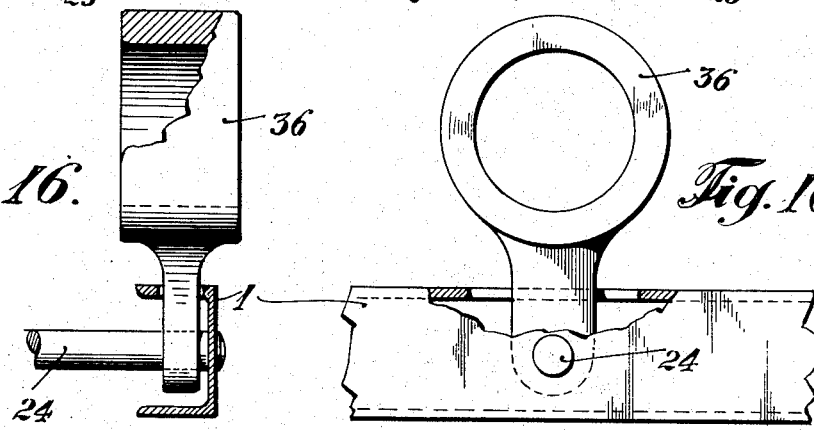

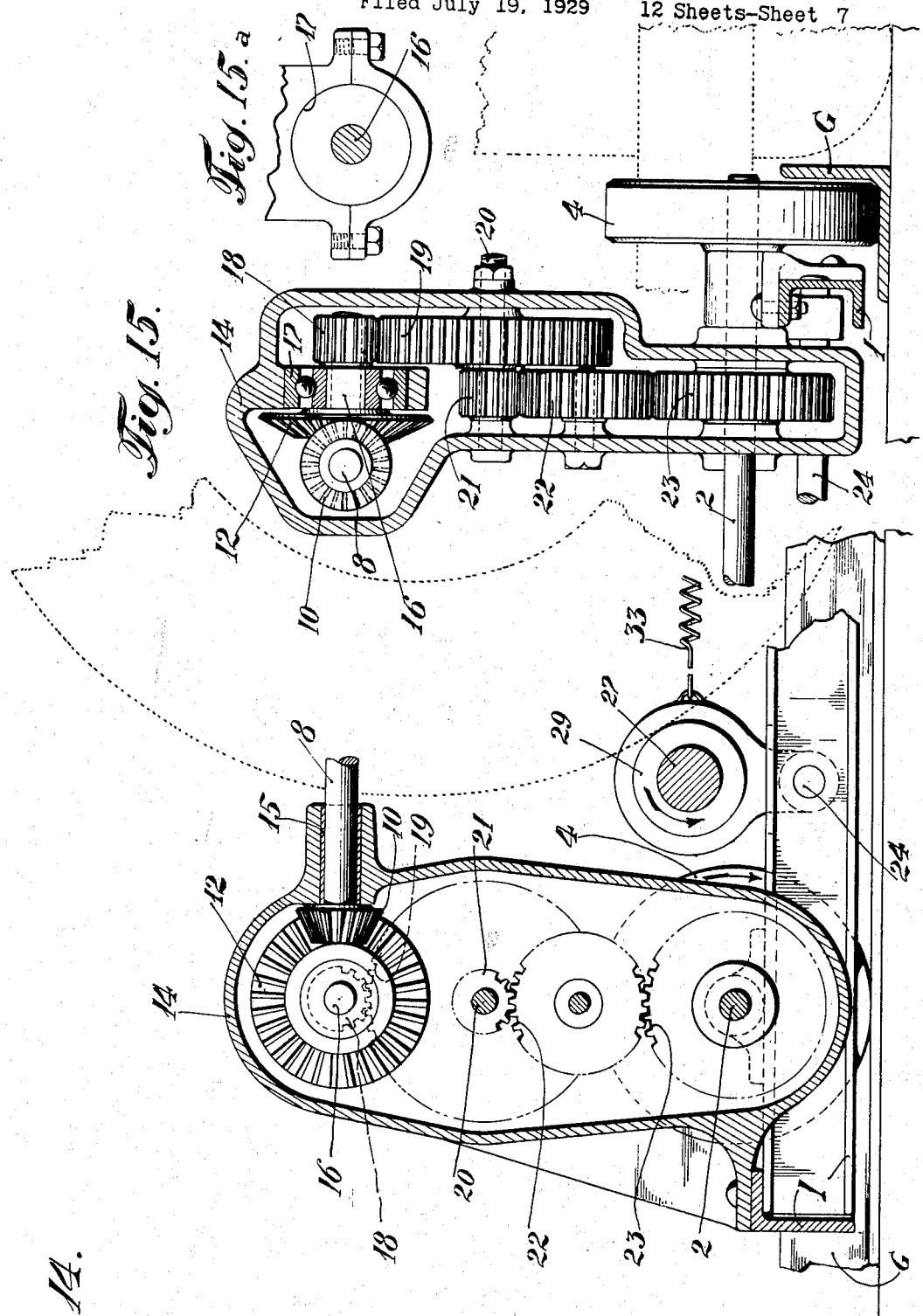

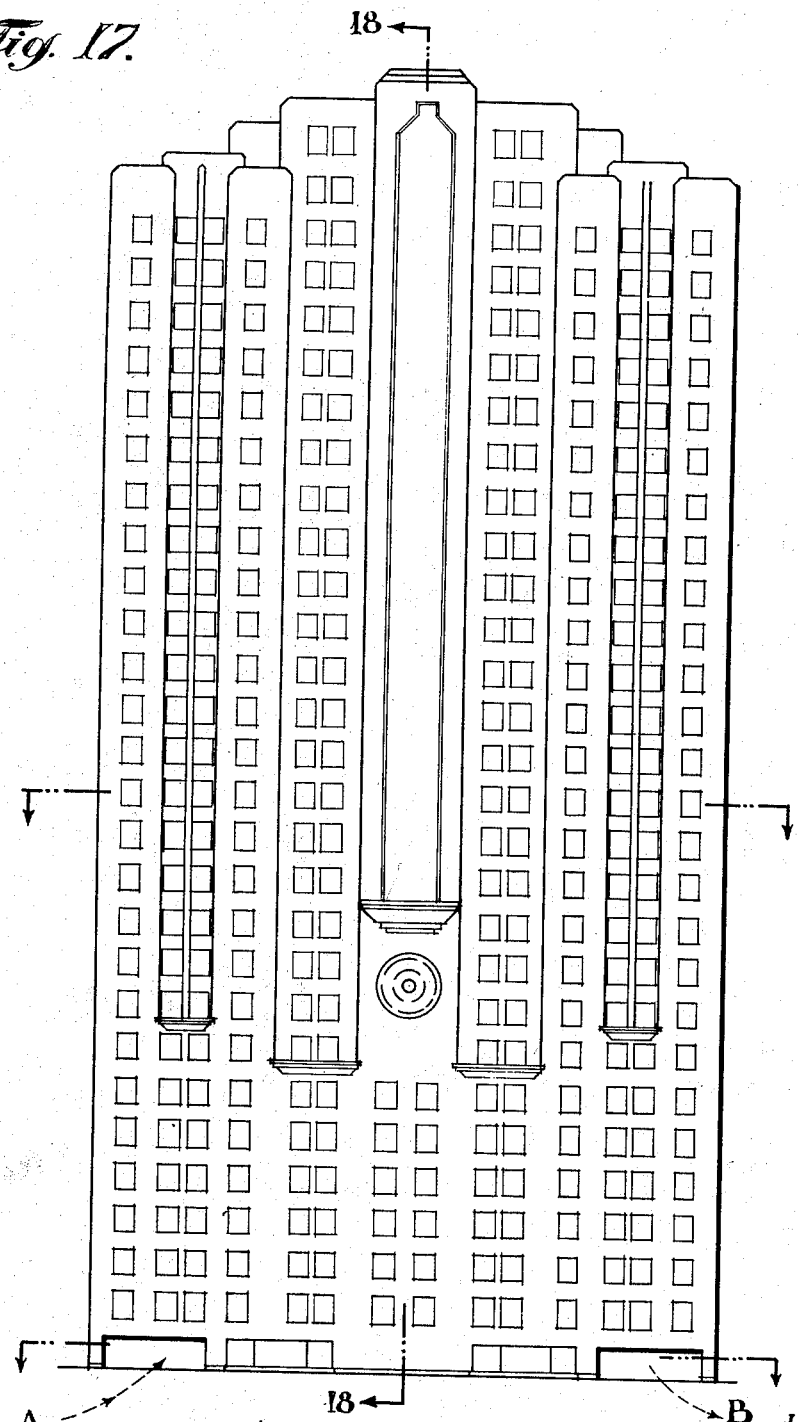

May 5, 1931. W. J. AITKEN 1,803,583
AUTOMOBILE HANDLING AND STORING APPARATUS
Filed July 19, 1929  12 Sheets-Sheet 12

INVENTOR
William J. Aitken
BY
ATTORNEY

Patented May 5, 1931

1,803,583

UNITED STATES PATENT OFFICE

WILLIAM J. AITKEN, OF CHICAGO, ILLINOIS, ASSIGNOR, BY MESNE ASSIGNMENTS, TO NATIONAL PARKING GARAGES, INCORPORATED, A CORPORATION OF DELAWARE

AUTOMOBILE HANDLING AND STORING APPARATUS

Application filed July 19, 1929. Serial No. 379,509.

The problems arising from the tremendous increase and use of automotive devices, such as automobiles, has given rise to intensive study of traffic and parking, both in large and small cities.

City officials have their particular problems in the regulation of traffic, but they are tremendously hampered through parking of cars on thoroughfares. Traffic might be much more easily regulated if suitable garage and parking locations were arranged at convenient points throughout a city, so that automobile drivers and users could have adequate facilities for parking their cars without choking traffic on thoroughfares.

Again, the fire hazard has become a serious problem and has interfered very largely with adequate provision for garaging and parking cars. Almost every large city has been compelled to provide a zoning system due to the hazards incurred in the garaging and parking of cars. This prohibits the location of suitable housing, parking and garage service often in the very zones where proper safe handling of automobiles would relieve the difficulties and the inconvenience to owners as well as the fire hazard.

Property values again interfere with parking and garage service as heretofore provided and there has always been the great danger of moving cars about under their own power, even after entering a garage. The fire hazard is increased, often times to the point of prohibition, in given zones and there is always the danger of noxious gases, which are emitted in great volume, when cars are being manipulated within a building by backing, turning and going forward to place them in their proper parking space in the building.

The present invention contemplates improving, if not entirely obviating many of the existing objectionable features.

Generally speaking, it contemplates types of buildings with automatic handling devices by which the automobiles may be moved about and stored or parked with great rapidity and without necessitating the direct operation of the automobile. Such buildings may be erected on comparatively small blocks and be of a height which will accommodate the maximum number of automobiles, insuring the greatest safety in handling.

Automobiles may be handled in these buildings entirely by mechanical means. In fact, they may be locked so that they cannot be tampered with by the operatives who manipulate the parking machine.

The driver of an automobile simply drives his car into the lower floor of the building, throws off his brake and locks his car so that it cannot be operated except by himself. The operatives then manipulate a parking device which carries the automobile on to an elevator where it is raised to any given floor of the building and by the same parking device is moved into some predetermined parking space. When the owner requires his car for use, the same apparatus, controlled by the operatives, delivers the car to the lower floor where the owner unlocks it and drives away.

Beyond the fumes arising from driving the car straight into the building, there can be no further accumulation, as the automobile is in an inoperative condition, when once it enters the building and is directly in position to be moved by the parking device.

Such an arrangement, as above suggested, provides for many unusual conditions. With the apparatus hereinafter described, office buildings, hotels, apartment buildings, department stores may be equipped to give a maximum of convenience and speed in parking with a minimum available space, providing at the same time, great efficiency, simplicity of operation, economy from many standpoints and a factor of safety never heretofore approached.

The apparatus shown and described entirely does away with the running of the motor as soon as the car is driven into the garage. The motor is not again put into operation until the car is delivered to the owner. In fact, it provides an entire automotive method of parking automobiles and eliminates the racing of motors, the attendant burning of brake bands and tires, the necessity of lost time on deliveries, the dangers of carbon-monoxide gas, fire and theft, to say nothing of the denting or breaking of fenders and marring sides of the automobile body.

Furthermore, no attendant with greasy uniform comes in contact with the rich and elaborate upholsteries. The whole system is devoid of improper handling of an automobile through human error.

It is an object of the present invention to overcome difficulties, above indicated, and the objections of manually handling automobiles, either by their owners or by attendants. It is a further object to provide and include a very efficient storing apparatus by which one or even a plurality of automobiles may be moved on to and off from elevators and delivered to any desired space on the various floors of the building.

This entirely does away with ramps and makes the entire space within the building available for storage.

One of the principal objects of the invention is to provide a parking device having its own automotive power which power may be directly exerted and translated through an intermediate driving mechanism to rotate the wheels of an automobile in either direction, thus providing for rolling the automobile forward on its own tires or rolling it backward.

In addition to the rotary movement translated to the wheels of the automobile there is also a direct thrust or pushing movement exerted by the parking device.

Quite an important object is to provide a parking device which will handle a plurality of automobiles at the same time. This facilitates the operation of moving automobiles, as it doubles the speed of handling and parking and effects a very great economy.

In addition to the above objects, there is that resulting from the elasticity of operation of the parking device. The automobile need not be placed in an exact position by its driver as the parking device may be run into any position convenient for engaging the tire of the automobile on one side and may then be moved to engage the wheel of the automobile on the opposite side.

There is a further object resulting from the direct engagement with and the driving of the automobile wheels. This absolutely relieves all strain on the automobile parts, as no lifting pressure is exerted on any part of the automobile mechanism. It is simply rolled upon its own tires, either forward or backward.

An object of great importance is to provide a parking device which exerts its influence upon the automobile entirely outside the tread limits of the automobile wheels. It is not, therefore, limited in size or construction to the height of the parts of the automobile above the tread surface or ground level.

No primary adjustment of the device with reference to the car is necessary other than that of placing the parking device in position so that upon the forward or backward movement of said parking device its automotive power will be delivered directly to the wheels of the automobile for rolling it forward and backward.

Other objects will be apparent as they are pointed out in the following description.

Figure 1, is a plan view of the parking device with the casing of the driving gear assembly broken in section and without the control mechanism.

Figure 2, is a side elevation on the line 2—2 of Figure 1, with the addition of the controlling mechanism.

Figure 3, is a sectional view in side elevation showing the method of controlling the power transmitting rolls.

Figure 4, is a detailed sectional view of the motor support.

Figure 5, is a plan view without the motor and gearing, showing one set of power transmitting rolls projected in position to act upon the tire. The second set of transmitting rolls is in normal inactive position.

Figure 6, is an end elevation of the parking device.

Figure 7, is an enlarged detail, partially broken in section, of the fork and appurtenant parts for moving the transmitting rolls.

Figure 8, is a similar view in side elevation.

Figure 9, is a detail of the central support stop for the shaft of the transmitting rolls.

Figure 10, is a side elevation of the part, shown in Figure 9.

Figure 11, is a cross sectional view on the line 11—11 of Figure 5.

Figure 12, is a diagrammatic view showing the driving elements of the parker in engagement with an automobile wheel and driving it in one direction.

Figure 13, is a similar view showing the drive in the opposite direction.

Figure 14, is an enlarged sectional view on the line 14—14 of Figure 1, showing the gear transmission from the motor shaft to the driving wheels of the parking device.

Figure 15, is a similar view on the line 15—15 of Figure 1.

Figure 15a, is a detailed view of the bevel gear bearing.

Figure 16, is an enlarged sectional detail on the line 16—16 of Figure 5, showing the rocker arm of the transmitting rolls.

Figure 16a, is a view at right angles to that of Figure 16.

Figure 17, is a somewhat diagrammatic outline of a parking building.

In illustrating my invention, I have chosen to show an electric motor as a power unit for driving the parking device, this being a convenient type of apparatus for the purposes.

I have not illustrated the various electrical connections for the motor, nor the details of the electrical apparatus and connections for the elevators which carry the parker and its automobiles (to be parked) to the various floors of the building, such connections and elevating apparatus need no detail description or illustration herein. Furthermore, in showing a characteristic application of my invention, I have illustrated a building having three elevators, thus providing for the handling of six cars during any one given period of time.

Of course, the parking device may pick up a single car or deliver a single car, as the case may be, but it has a capacity along with its elevator, for handling a plurality of cars. I have chosen to illustrate it as handling two cars, although obviously, the parker might be doubled in capacity by duplication of its parts, as illustrated herein.

Figure 18:
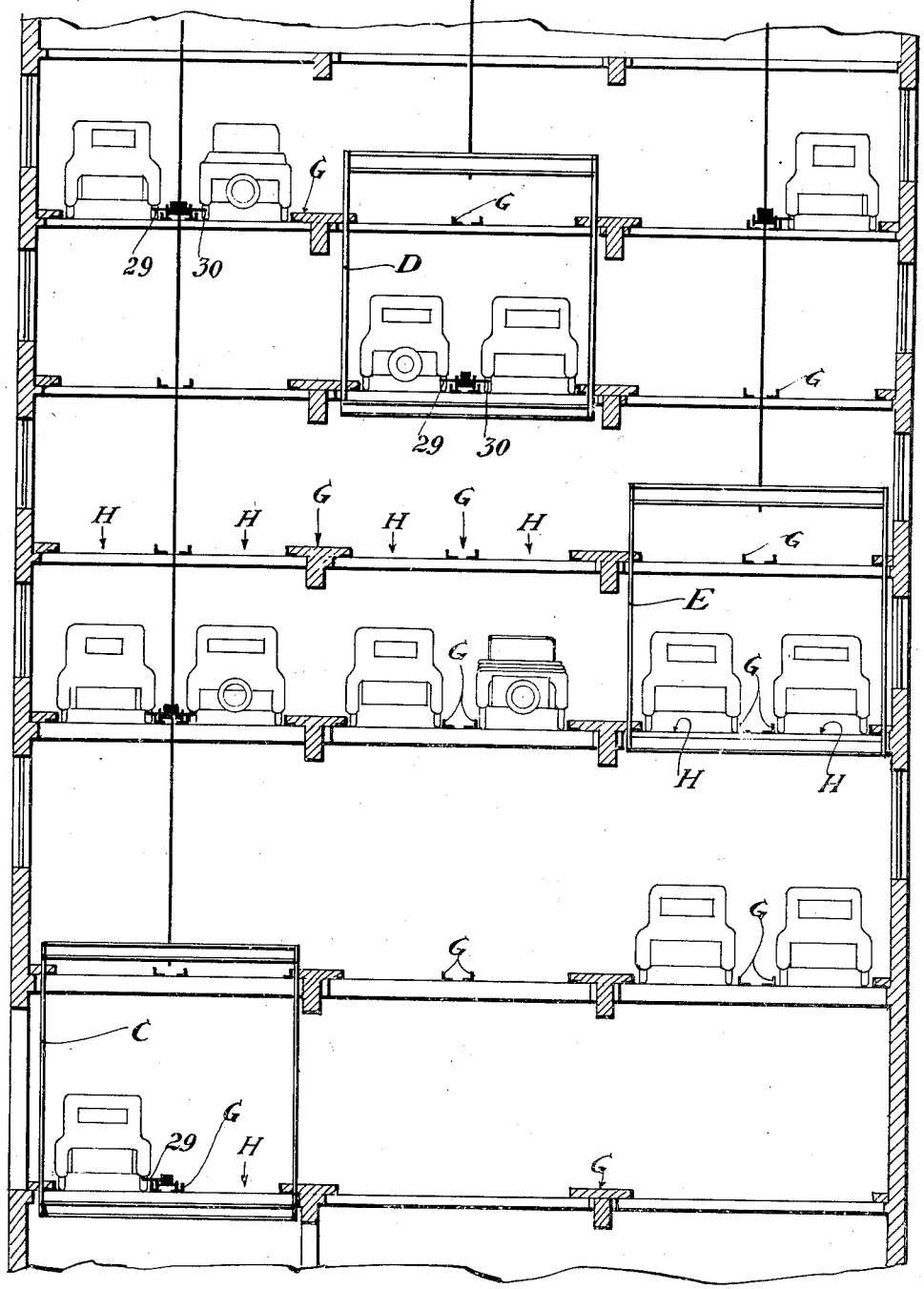
Figure 18, is a diagrammatic section of the building on the line 18—18 of Figure 17, and the line 18a, 18b, of Figure 19.
Figure 19:
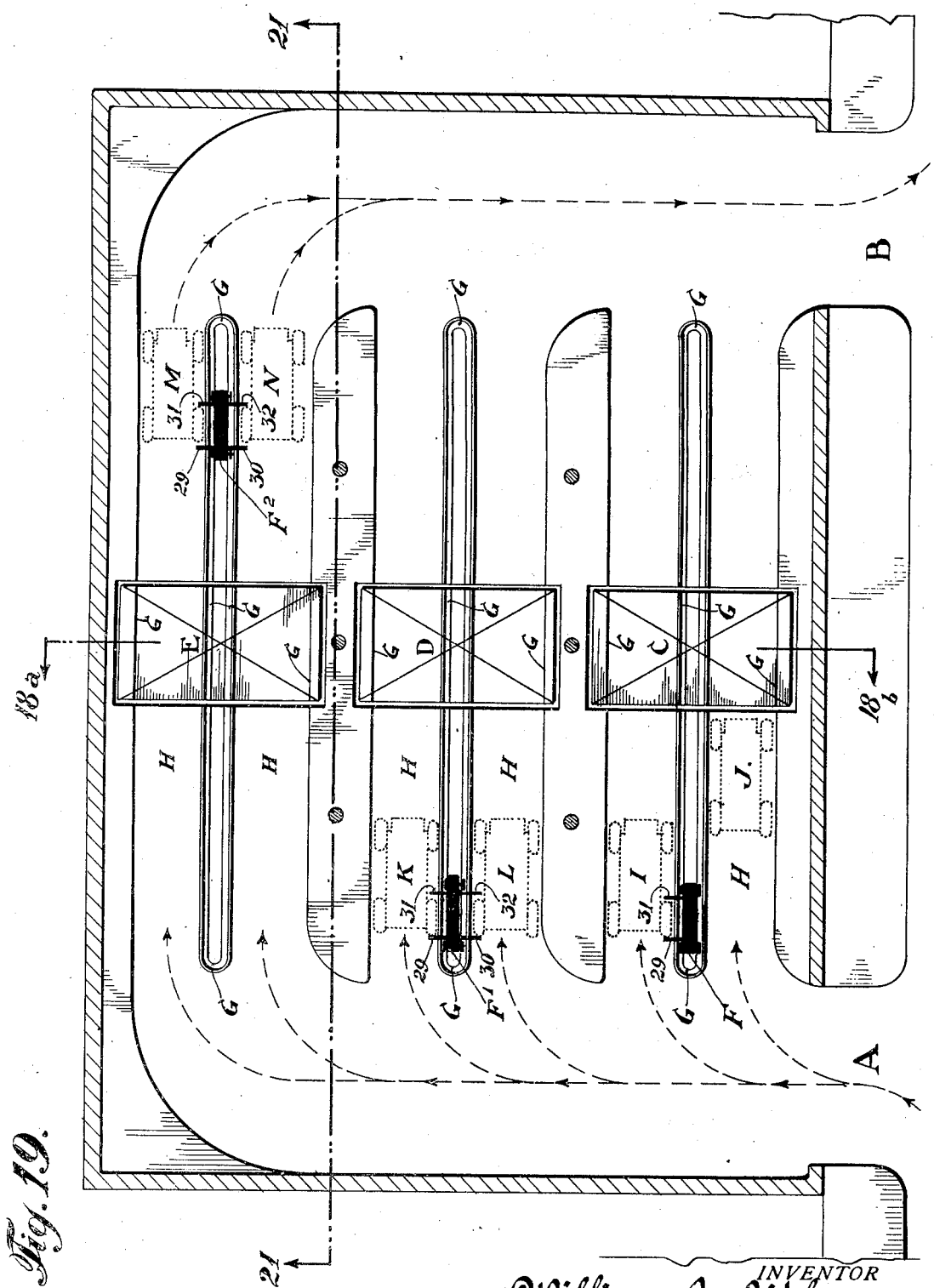
Figure 19, is a diagrammatic ground floor plan showing the entrance and exit for automobiles.
Figure 20:
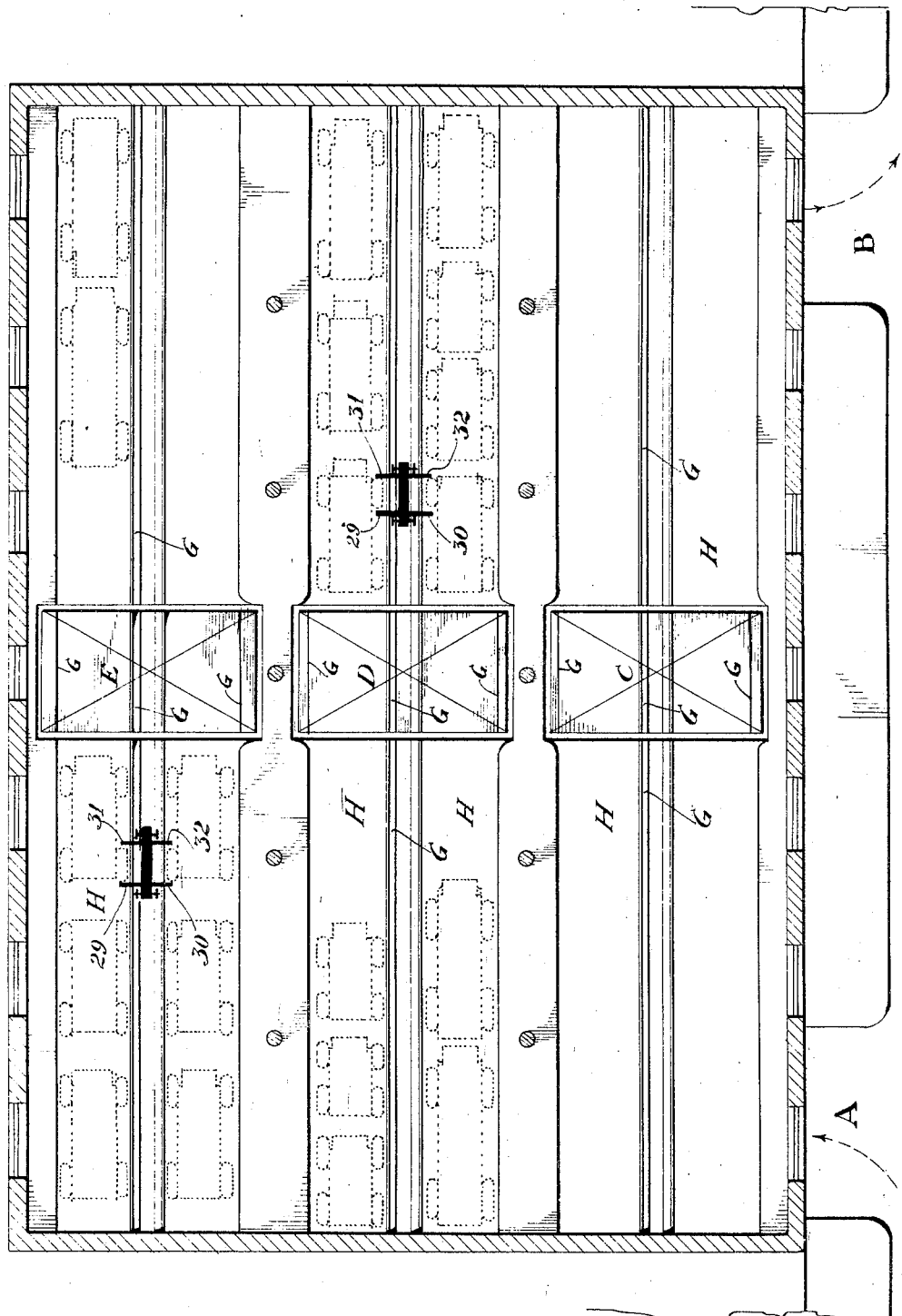
Figure 20, is a diagrammatic view showing an upper floor with the emplacement of automobiles.
Figure 21:
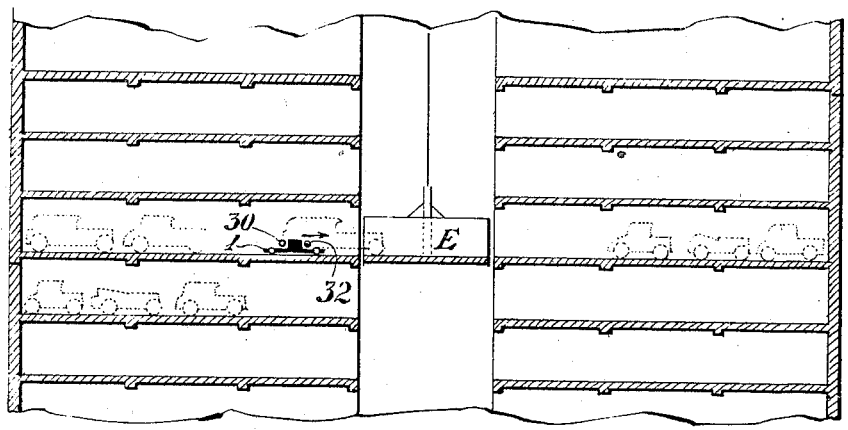
Figure 21, is a diagrammatic sectional view through a number of upper floors on the line 21—21 of Figure 19.

Obviously, provision must be made for entrance to and exit from the building and this is best illustrated in the type of building herein shown in Figure 19, where A, indicates the entrance and B, the exit.

As illustrated, there are three elevators C, D, E, which, of course, are suitably arranged to carry their load from the ground floor adjacent to the entrance A, to any of the upper floors of the building.

For each elevator, there is a parking unit F, F', F², which parking unit runs within a guide way G, both at the entrance side and exit side of the elevators. There is also provided a similar guide way on the elevators C, D, E.

There are also guide ways H, one on each side of the guide ways G. These also are carried on to the elevators and are arranged on opposite sides of the elevators respectively, at the entrance and exit sides.

Each floor of the building is provided with similar guide ways both for the parking device and for the automobiles to be parked and these guide ways extend to the full length or breadth of the building, as the case may be, on opposite sides of the elevators or elevator shafts.

Of course, the length of trackage or guide ways largely determines the capacity of the parking space of the building.

The parker F, is illustrated as having engaged the wheel of an automobile I, at one side and in its passage toward the elevator, they engage the wheel of the automobile J.

The parking device F', is illustrated as having engaged the automobiles K, L, for simultaneously rolling them to the elevator. The parker F², is shown as delivering the automobiles M, N.

It is believed that the method of handling is quite apparent from the above brief outline.

Automobiles are driven into the entrance and left in one of the guide ways H. Parking devices are then moved into position to engage the wheel of the automobiles and transmit power thereto for rotating the wheels, thus carrying them forward on to the elevators. The elevators then rise to the desired floor and the parker moves forward carrying the automobiles from the elevator along the guide ways to a given position. The parker is then disconnected from its driving position and may be moved back and forth for moving cars into the guide ways or it may be moved on to the elevator and carried to any desired floor, where it may pick up one or a plurality of automobiles, rolling them to the elevator, to deliver them to the ground floor in the guide ways at the exit side of the building.

Of course, the owner merely drives his car into the guide ways and on entering locks the car securely and it need never be unlocked or tampered with until it is delivered to him at the exit side of the building.

The guide ways for the parking devices may very conveniently be formed of angle iron and these angle irons also serve as a convenient guide for the tires of the automobiles.

Of course, any particular form of trackage may be selected to meet any given requirement of guiding the automobiles along guide ways.

Of course, the matter of guide ways is one of selection, but there is some advantage in using the angle irons shown and described, as they may be placed directly upon the structural steel of the buildings and the floors laid in any required or desired fashion of fireproofing.

The floor filling, aside from the guideways, carries no load.

In the accompanying drawings, the automotive device for supplying the power for moving the automobiles is for convenience, termed a "parker". It is of comparatively simple and sturdy construction and is illustrated as utilizing an electric motor for developing the necessary power.

Obviously, any form of power, as for instance, hydraulics or compressed air, might be utilized and would fall within the scope of the invention.

The parker consists of a sturdy frame 1, conveniently made of channel irons which forms a complete chassis for supporting a motor P, which, for convenience, is raised above the channel iron frame upon a motor stand P'.

There is a driving axle 2, 3, adjacent to each end of the frame 1, which axles carry the driving wheels 4, 4, and 5, 5.

The motor shaft is connected through couplings 6, 7, with extension shafts 8, 9, each of which bears a bevel pinion 10, 11, meshing with bevel gears 12, 13.

As the reduction gears at each end of the parker are identical in arrangement, description is confined to a single gear reduction.

There is a casing 14, bolted to the frame 1, and having a bearing 15, for the shaft 8. Within this casing is mounted the bevel gear 12, which is meshed with the bevel pinion 10. This gear 12, has its shaft 16, provided with a ball bearing 17, which is housed in the casing and clamped therein, as best illustrated in Figures 15, and 15a.

Beyond the bearing and secured to the shaft 16, is a pinion 18, meshing with the gear 19, upon a shaft 20, which shaft also bears a pinion 21, that in turn meshes with an intermediate gear 22. The latter meshes with the gear 23, which is secured to the shaft 2, and drives the wheels 4, 4.

These wheels may be of comparatively large diameter inasmuch as the parker does not run under the automobile, but runs alongside of it. Likewise, the gear parts and motor may be of ample size, as they are not limited by the height of the automobile to be parked.

Of course, the gear transmission illustrated is merely exemplary, and any desired and efficient drive may be interposed between the source of power P, and the axle shafts 2, 3.

Parallel to each of the driving axles 2, 3, are shafts 24, 25, which at their ends are supported in the longitudinal channel members of the frame 1. They serve as rocker shafts and at their center have a support 26, for shafts 27, 28. The shafts 27, 28, support power transmitting rolls 29, 30, 31, 32.

These power transmitting rolls are slidable on the supporting shafts 27, 28, and in normal position have their inner ends resting against the supporting elements 26, which form stops therefor. They, of course, may be projected outward beyond the sides of the parker frame and its wheels, as illustrated in Figure 5.

The shafts 27, 28, with their respective power transmitting rolls are normally held toward each other by springs or other convenient means 33, 34, and away from the wheels 4, 5, of the parker. These springs 33, 34, are connected with rocker arms 36.

These power transmitting rolls may, to give greater traction in driving, be knurled or covered with rubber, cork or any other efficient material for preventing slippage. Incidentally, the wheels 4, 5, are preferably so covered, as indicated in the drawings.

The spacing between the elements 29, and 31, and 30 and 32, is such that these power transmitting rolls may be projected fore and aft of an automobile tire without bringing them in contact with the driving wheels 4, 5, of the parker.

The rolls are each provided with a groove 35, and rocker arms 36. Within these grooves are clamped rings 37, having pins 38, 39, which are engaged by forks 40, 41, 42, 43, formed at the end of controlling levers 44, 45, 46, 47. These levers are pivoted to a frame part of the parker as at 48, 49, 50, 51, and have extended arms 52, 53, 54, 55, engaging opposite sides of cams 56, 57.

The cams illustrated are substantially of elliptical form, cam 56, being shown in position to permit the rolls 29, 31, to be moved outward under the influence of springs 58, 59, while the cam 57, is in position to retract the rolls 30, 32. These cams, as illustrated, are shown as being controlled by levers 60, 61.

Figure 22:
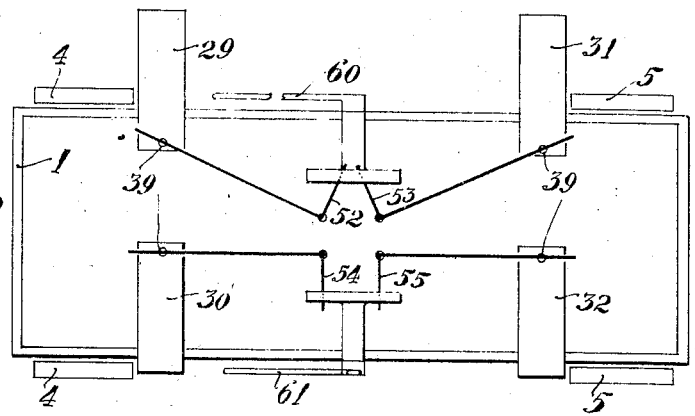
Figure 22, is a somewhat diagrammatic plan view of a positive means for actuating the power transmitting roll levers.
Figure 23:
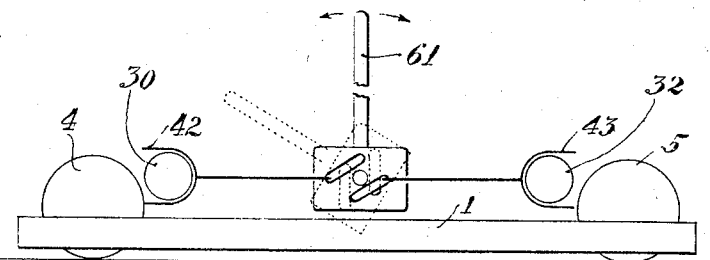
Figure 23, is a similar face view.

A modification of the cam arrangement is illustrated in Figures 22, 23, wherein the cams are made of "box form" and engage the ends of the levers 52, 53, 54, 55, so that the levers are positively moved in both directions of their throw and are not dependent upon springs for projecting them into driving position.

Of course, the motor of the parker is controlled at some distant point and it is quite obvious that the levers 44, 45, 46, 47, for guiding the rolls 29, 30, 31, 32, might very well be controlled automatically from a distance by applying suitable connections to the shafts of the cams 56, 57.

Throughout the drawings, the automobile tire is illustrated in dotted outline and it will be quite apparent that when the car is to be moved, a pair of rolls 29, 31, are projected on opposite sides of the tire.

As soon as the parker is moved by its motor one or the other of the power transmitting rolls is brought into contact with the tire and thereupon is forced backward against the corresponding wheel of the parker.

Thus, the power which drives the parker is transmitted through its wheels to the power transmitting roll which is in contact with the automobile tire and the roll then acts as the transmission device for rotating the wheels of the automobile. The direction of movement of the automobile is controlled by the direction of movement of the parker and obviously, will be rolled on its own tires backward or forward dependent upon which of the tire transmitting rolls 29, 31, (for instance) is brought into contact with the tire.

It is quite obvious that the automobile cannot over run as it will be immediately stopped by the action of one of the power transmitting rolls. In fact, it can only move as fast as the parker moves.

It will be quite apparent that the parker exerts, not only a direct pushing effect to overcome the inertia of the automobile, but actually exerts a power drive for rotating the automobile wheels.

It is quite as apparent that two automobiles may be handled and rolled upon their tires, just as readily as one.

The power transmitting rolls, for instance, 29, 31, at one side of the parker may be brought into engagement with a tire of an automobile and although the second automobile on the opposite side is not in line with the power transmitting rolls, 30, 32, the parker may be moved along the guideway carrying with it one automobile until it is in position to pick up the second automobile on the opposite side, with the rolls 30, 32. Thereupon, the two automobiles may be simultaneously moved as expeditiously as one may be carried forward and backward.

There is, therefore, an elasticity to the parker which, applicant believes, is new in that a single automobile or a plurality of automobiles may be handled simultaneously.

It will be noted that no strain whatever is put upon any part of the automobile as is the case where an under running parking device is employed. In such event, the parker must reach up and grip some non rotary portion of the automobile to be moved and this grip must be sufficient to insure a movement thereof. Furthermore, the automobile is never moved from its normal position of running on the ground surface. Therefore, no strains whatever, are placed upon the springs or other running gear or the chassis, to transport the automobile from one position to another.

It is conveyed in an absolutely normal manner on its own tires over a smooth road surface (namely the guideways).

The parker must obviously be capable of movement in two directions, forward and backward and it follows, without further explanation, that the power driven unit for the parker is reversible. Obviously, the details and construction of the parker may be modified to suit the exigencies of any particular requirement.

The drawings and explanations herein given show and describe the practical and operative form of device.

The elemental forms which will function to secure the results expressed may be modified to any degree without changing the spirit or intent of the invention.

Three elevators are illustrated midway of the building. Obviously, the number of elevators and their location within the building is immaterial to the inventive idea and obviously, in certain types of buildings, one or more elevators may be arranged at or adjacent to the end of the building or the side thereof, as particular conditions may demand.

What I claim as my invention, and desire to secure by letters patent is:

1. In an automobile storing and handling apparatus, a building having an entrance and an exit, an elevator intermediate the entrance and exit, parallel guideways for automobiles arranged on opposite sides of the elevator for guiding automobiles to and from the elevator, said elevator intercepting the guideways and being provided with parallel guideways registering with the automobile guideways, and a parker guideway parallel to and intermediate the automobile guideways.

2. In an automobile storing and handling apparatus, a building having an entrance and an exit, an elevator intermediate the entrance and exit, parallel guideways for automobiles arranged on opposite sides of the elevator for guiding automobiles to, from, and across the elevator, said elevator intercepting the guideways and being provided with parellel guideways registering with the automobile guideways, and a parker guideway parallel to and intermediate the automobile guideways.

3. In an automobile storing and handling apparatus, a building having an entrance and an exit, a plurality of elevators intermediate the entrance and exit, a plurality of parallel guideways for automobiles for each elevator arranged on opposite sides of the elevators for guiding automobiles to and from the elevators, said elevators each interrupting certain of the guideways and being provided with parallel guideways registering with its automobile guideways and a parker guideway parallel to and intermediate each pair of automobile guideways.

4. In an automobile storing and handling apparatus, a building having an entrance and an exit, a plurality of elevators intermediate the entrance and exit, a plurality of parallel guideways for automobiles for each elevator arranged on opposite sides of the elevators for guiding automobiles to, from, and across the elevators, said elevators each interrupting certain of the guideways and being provided with parallel guideways registering with its automobile guideways and a parker guideway parallel to and intermediate each pair of automobile guideways.

5. In an automobile storing and handling apparatus, a building having an entrance and an exit, an elevator intermediate the entrance and exit, an elevator shaft, a plurality of floors for the parking of automobiles, each served by the elevator, parallel guideways for automobiles arranged on opposite sides of the elevator and its shaft on each floor, for guiding the automobiles to and from the elevator when the latter is in registering position at any given floor, said elevator and its shafts interrupting the guideways and being provided with parallel guideways, registering with the automobile guideways, and a parker guideway parallel to and intermediate the automobile guideways.

6. In an automobile storing and handling apparatus, a building having an entrance and an exit, an elevator intermediate the entrance and exit, an elevator shaft, a plurality of floors for the parking of automobiles, each served by the elevator, parallel guideways for automobiles arranged on opposite sides of the elevator and its shaft on each floor, for guiding the automobiles to, from, and across the elevator when the latter is in registering position at any given floor, said elevator and its shafts interrupting the guideways and being provided with parallel guideways, registering with the automobile guideways, and a parker guideway parallel to and intermediate the automobile guideways.

7. The method of storing automobiles in a building which consists in providing auto guideways, on each floor of the building, extending from registering guideways of an elevator and with a parker guideway parallel with but at the side of the automobile guideway; positioning the automobiles in a guideway, applying a driving power from the parker to the wheels of the automobile, rotating the automobile wheels to roll the automobile forward and backward in the guideways and disconnecting the driving power of the parker when the automobile is parked in desired position in its selected guideway.

8. The method of storing automobiles in a building which consists in providing automobile guideways on each floor of the building, extending on both sides of registering guideways of an elevator and with parker guideways parallel with but at one side of the automobile guideways; positioning the automobiles in a guideway, applying a driving power from the parker to the wheels of the automobile, rotating the automobile wheels to roll it to, from, and across the elevator into any desired position, in one of the automobile guideways and disconnecting the driving power of the parker from the wheel when the automobile is finally parked.

9. The method of storing automobiles in a building, which consists in providing a plurality of automobile guideways, with an intermediate parking guideway, on each floor of a building, said guideways registering with similarly arranged guideways upon an elevator, applying a driving power to the wheels of a plurality of automobiles from a parker, rotating said wheels to roll the automobiles along the guideways of the floors and elevator in either direction, to a selected position and disconnecting the driving power of the parker from the wheels when the automobiles are finally parked.

10. The method of storing automobiles in a building which consists in providing a plurality of automobile guideways and a parker guideway for each pair of automobile guideways, the guideways being common to the various floors of a building and to an elevator; applying power and a rotary motion to the wheels of a plurality of automobiles for moving them on to an elevator, raising said automobiles to a desired floor, applying power from the parker, and a rotary motion to the wheels of the automobiles, rolling said automobiles along the guideways to a predetermined position, disconnecting the driving power elements of the parker from the wheels, returning said parker to the elevator and to the ground floor of the building to apply its power to the wheels of succeeding automobiles, which it is desired to park.

WILLIAM J. AITKEN.